SPOFFORD & RAFFINGTON.
Velocipede.
No. 91,379.  Patented June 15, 1869.
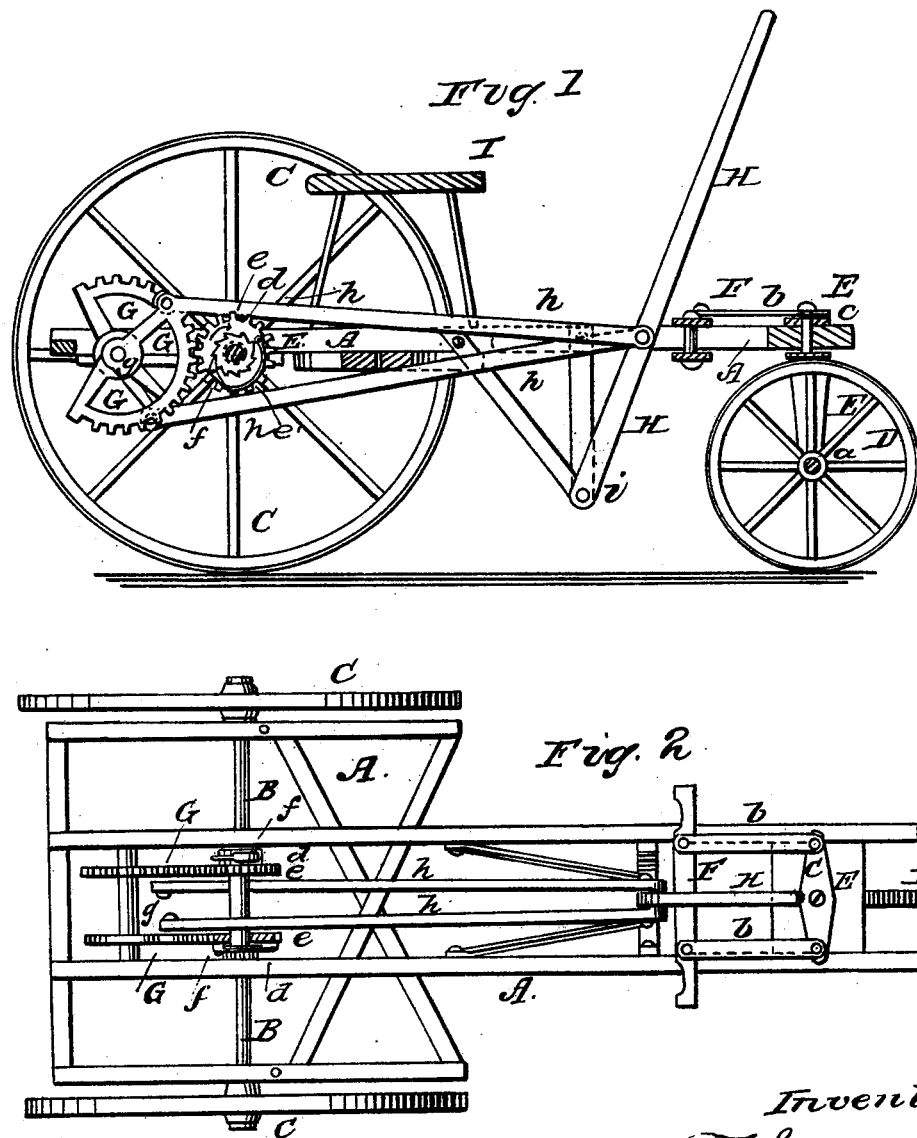

United States Patent Office.

FISHER A. SPOFFORD AND MATTHEW G. RAFFINGTON, OF COLUMBUS, OHIO.

Letters Patent No. 91,379, dated June 15, 1869.

IMPROVEMENT IN VELOCIPEDE.

The Schedule referred to in these Letters Patent and making part of the same.

*To all whom it may concern:*

Be it known that we, FISHER A. SPOFFORD and MATTHEW G. RAFFINGTON, of Columbus, in the county of Franklin, and State of Ohio, have invented a new and improved Velocipede; and we do hereby declare that the following is a full, clear, and exact description thereof, which will enable others skilled in the art to make and use the same, reference being had to the accompanying drawings, forming part of this specification, in which—

Figure 1 represents a vertical longitudinal section of our improved velocipede.

Figure 2 is a plan or top view, partly in section, of the same.

Similar letters of reference indicate corresponding parts.

This invention relates to a new driving-mechanism for velocipedes, and has for its object to provide greater leverage, and consequently greater power than could heretofore be obtained.

The invention consists in the application of toothed segments, which are connected with one single lever, in such manner that they will simultaneously be oscillated in opposite directions, so that the one swinging backward will impart motion, by means of a pinion and ratchet-pawl, to the driving-axle.

The pinions are hung loose on the driving-axle, and are connected with the same by means of ratchet-wheels and pawls, so that the one moved forward will carry the axle around with it, while the other one will slip loose on the same.

A, in the drawing, represents the frame of our improved velocipede.

B is the rear axle, having its bearings in suitable boxes, that are arranged on the frame, and carrying the wheels C C at its ends.

D is the front wheel. Its axle, *a*, has its bearings in the steering-post E, which is swivelled in the front part of the frame, and which is operated by the feet of the veloceman, by means of a lever, F, which is, by means of rods *b b*, connected with a cross-bar, *c*, of the steering-post, as shown.

On the rear axle are mounted two ratchet-wheels, *d d*.

Two pinions, *e e*, are hung loose on the axle B, and are, by means of spring-pawls *f*, connected with the ratchet-wheels, so that they will, when turned in the direction of the arrow, carry the axle around with them, while they will slip loose when turned in the opposite direction.

G G are two toothed segments, which are pivoted, by a pin, *g*, to the frame A, and which mesh into the pinions *e e* respectively. They are, by means of rods *h h*, connected with a lever, H. which is pivoted to the front part of the frame, within convenient reach of the driver's seat I.

One rod, *h*, is fastened to the upper end of one segment G, while the other is fastened to the lower end of the other segment, so that as the lever H is swung on its pivot *i*, one segment will be swung forward, while the other moves backward.

That segment which is moved backward, will turn its pivot in the direction of the arrow.

The oscillations of the lever H, changing the motion of the segments, will cause a constant motion of the axle B to be produced.

Having thus described our invention,

We claim as new, and desire to secure by Letters Patent—

The combination of the lever H with the rods *h h*, toothed segments G G, pinions *e e*, spring-pawls *f f*, ratchet-wheels *d d*, and axle B, all arranged and operating substantially as and for the purpose herein shown and described.

FISHER A. SPOFFORD.
MATTHEW G. RAFFINGTON.

Witnesses:
J. S. PARCELS,
J. D. HENDERSON.